United States Patent Office 3,632,555
Patented Jan. 4, 1972

3,632,555
PREPARATION OF EPOXYLATED PHENOLIC RESINS BY REACTING POLYMERS FROM ARALKYL ETHERS AND PHENOLS WITH EPIHALOHYDRIN
Glyn I. Harris and Alfred G. Edwards, Glamorgan, Wales, England, assignors to Albright & Wilson Limited, Oldbury, near Birmingham, Warwickshire, England
No Drawing. Filed July 22, 1968, Ser. No. 746,283
Claims priority, application Great Britain, July 21, 1967, 33,701/67
Int. Cl. C08g 30/12
U.S. Cl. 260—47 EA                    12 Claims

ABSTRACT OF THE DISCLOSURE

Epoxylated phenolic resins are prepared by reacting in the presence of a hydrogen halide acceptor (1) a polymer formed by the reaction of an aralkyl ether and a phenolic compound, or both a phenolic compound and a compound containing aromatic nuclei, and (2) an epihalohydrin. The resins may be cured by reaction with an epoxy curing agent or converted to surface coating materials by reaction with a fatty acid.

---

This invention relates to epoxylated phenolic resins and to a process for their preparation. The invention also relates to resinous surface coating materials which may be prepared from the said epoxylated phenolic resins.

According to the invention there is provided a process for the preparation of an epoxylated phenolic resin which comprises (1) forming a polymer by reacting together (A) an aralkyl ether of the general formula $R'[—(CH_2OR)]_a$, where $R'$ is a divalent or trivalent aromatic hydrocarbon or hydrocarbonoxy radical which optionally contains inert substituents in the aromatic nucleus, R is an alkyl radical containing less than 6 carbon atoms and $a$. has a value of 2 or 3, with a molar excess of (B) a phenolic compound, or of both a phenolic compound and a compound containing one or more aromatic nuclei, and (2) thereafter reacting the polymer with an epihalohydrin in the presence of a halogen halide acceptor.

The invention further provides epoxylated phenolic resins when prepared by the said process.

The term "phenolic compound" as employed herein includes any compound or mixture of compounds derived from benzene and containing from one to three, preferably one or two, hydroxyl radicals attached to the aromatic nucleus, there being a total of not more than three substituents attached to carbon atoms in the benzene nucleus. Examples of phenolic compounds for use in the process of this invention include phenol, p-cresol, resorcinol, catechol, isopropyl catechol, diphenylolpropane, diphenylolmethane, alkyl phenols such as p-ethylphenol, p-tert-butylphenol and p-tert-octyl phenol, p-phenylphenol, m-phenylphenol, o-phenylphenol, pyrogallol and phloroglucinol. Most preferred as the phenolic compounds are those containing a single hydroxyl radical per aromatic nucleus for example, phenol, p-phenylphenol and diphenylolpropane.

In the general formula of the aralkyl ether R' may represent any divalent or trivalent aromatic hydrocarbon or hydrocarbonoxy radical, for example the phenylene radical, the diphenylene radical, the diphenylene oxide radical

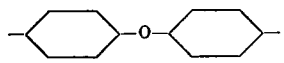

the radical

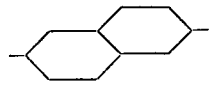

or the radical

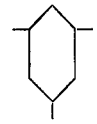

If desired the R' radicals may contain substituents for example methyl radicals attached to the aromatic nucleus provided the said substituents are inert under the conditions of the reaction. In fact the presence of chlorine or fluorine atoms in some or all of the available positions in the aromatic nucleus has been found advantageous in that it leads to improved flame resistance in the resulting polymeric products. An example of a substituted aralkyl ether which may be employed according to this invention is 2,3,5,6-tetrachloro-1,4-di(methoxymethyl)-benzene.

The radical R may be any alkyl radical containing less than 6 carbon atoms and is preferably the methyl, ethyl or propyl radical. The preferred aralkyl ethers for use according to this invention are the p-xylylene glycol dialkyl ethers, for example p-xylyleneglycol dimethyl ether.

The reaction between the phenolic compound and the aralkyl ether involves condensation of the alkoxy groups in the aralkyl compound with nuclear hydrogen atoms in the phenolic compound with the elimination of an alcohol. Preferably this process is carried out in the presence of a suitable catalyst for the reaction. Acidic materials, for example acidic or acid treated ball clays, sulphuric acid, p-toluenesulphonic acid and Friedel Crafts type catalysts such as stannic chloride, zinc chloride or ferric chloride are particularly effective in respect. The most preferred catalyst is stannic chloride.

The quantity of catalyst employed is not critical and from about 0.01 to about 1 percent by weight based on the weight of the reactants (1) and (2) has been found to be sufficient for most purposes although up to 3 percent or more may be used if desired. In order to obtain reasonably short reaction times the reactants are preferably heated to temperatures above about 120° C. and preferably within the range from about 150 to 200° C. The actual temperature employed will depend to some extent on the type of catalyst, and on the nature of the starting materials.

If desired organic solvents may be added to the reaction mixture for example to compatibilise the reaction components or assist in the recovery of the reaction product. Such organic solvents, if present, should preferably comprise the high boiling chlorinated aromatic compounds, with de-activated aromatic rings, for example chlorobenzene.

The time for which the first stage reaction (1) is carried out will depend upon such variables as the nature of the reactants (A) and (B), the type and quantity of the catalyst and the reaction temperature. Preferably the reaction is taken substantially to completion, the alcohol liberated during the reaction being removed by any suitable means.

The phenolic compounds may be employed alone in forming the polymers of this invention or they may be employed in the reaction in conjunction with compounds containing aromatic nuclei and not being phenolic compounds as required by this invention. The additional use of the said aromatic compounds in the reaction provides a means of modifying the properties of the product. Suitable aromatic compounds are those capable of condensation with the aralkyl halide or aralkyl ether and include for example diphenyl ether, dibenzyl ether, terphenyl, diphenylamine, diphenyl sulphide, diphenyl, anthracene, naphthalene, diphenyl sulphone, triphenyl phosphate, octaphenylcyclotetrasiloxane, aryl-substituted borazoles and metal complexes such as ferrocene. Preferably the compound containing aromatic nuclei is selected from diphenyl, terphenyl and diphenyl ether. The compound containing aromatic nuclei may be employed in proportions up to 100 percent or more by weight based on the weight of the phenolic compound. The upper limit will usually be determined by the proportion of phenolic hydroxyl radicals desired in the product for subsequent reaction with the epihalohydrin.

Conveniently the compound containing aromatic nuclei is mixed with the remaining reaction components and the reaction initiated. In some cases however, particularly where the aromatic compound is of low reactivity, it may be advantageous to cause at least partial reaction of that compound with the aralkyl ether prior to incorporating the phenolic compound in the reaction mixture.

When the compound containing aromatic nuclei is employed it is not then essential that the phenolic compound should itself be present in molar excess over the aralkyl ether provided that the total of the phenolic compound and the compound containing aromatic nuclei taken together represents the required molar excess. As the molar proportion of the aralkyl ether approaches that of the other reactant the reaction mixture exhibits an increased tendency to gel prematurely. Generally therefore we prefer to employ from about 1.3 to 3.0, and more preferably from 1½ to 2½ moles of the phenolic compound, or of the phenolic compound and the compound containing aromatic nuclei, for every mole of the aralkyl ether.

To obtain the epoxylated phenolic resins of this invention the polymeric product obtained by the reaction of the aralkyl ether and the phenolic compound, or the phenolic compound in conjunction with the compound containing aromatic nuclei, is reacted with an epihalohydrin.

The reaction may be conveniently carried out by mixing the polymeric product and the epihalohydrin, which is preferably epichlorohydrin, and heating the mixture to a temperature at which a hydrogen halide is evolved, such temperature normally falling within the range from 40° C. to 100° C. The reaction should be performed in the presence of an acceptor for the liberated hydrogen halide. As described hereinafter the epoxylated phenolic resins of the invention are curable by reaction with organic amines. The use of organic amines as the hydrogen halide acceptor materials is therefore best avoided if a stable reaction product is desired. Particularly suitable as the hydrogen halide acceptor are the alkali metal hydroxides e.g. sodium hydroxide.

Preferably the hydrogen halide acceptor is added slowly to the heated mixture of polymer and epihalohydrin such that the reaction mixture remains within a pH of from about 6.5 to 8.5. If desired solvents may be present in the reaction mixture. The presence of additional solvents is not usually necessary however, as the epihalohydrin is itself effective in this respect.

The proportion of epihalohydrin employed in the reaction will vary widely depending on the phenolic hydroxyl content of the polymer and on the degree of reaction required. Thus the epihalohydrin may be employed in proportions varying from a large deficiency to a large excess, based on equivalency of halo groups in the epihalohydrin and phenolic hydroxyl groups in the polymer.

Removal of any excess acceptor material and by-product salts from the reaction product may be achieved when desired by washing with water or other suitable solvent.

The reaction products produced according to the process of this invention are aromatic polymers containing glycidyl ether groups attached to aromatic nuclei. These epoxylated phenolic resins are generally obtained as viscous or solid materials and may be converted to a higher molecular weight state by reaction with known epoxy reactive curing agents, for example organic amines and polyamines such as N-methyl piperazine, M-phenylenediamine, triethylene tetramine, α,ω-polymethylene diamines, and polyether diamines, and acid anhydrides such as nadic methyl anhydride, maleic anhydride, chlorendic anhydride and pyromellitic dianhydride. In accordance with known techniques for curing epoxy-containing materials, the anhydrides are best employed in conjunction with an accelerator, for example a tertiary amine. The resins may, if desired be dissolved in solvents, for example methyl ethyl ketone and are useful for example as coating materials and as impregnants for fibrous substrates such as glasscloth and asbestos fabrics. They may also be employed as binders in the preparation of laminates, abrasive wheels and other moulded products, and are particularly suitable for use in the manufacture of components, for example impeller blades, where the absence of by-products during the curing process is of particular value. If desired they may be compounded with various fillers, for example silicas, and metal oxides, pigments and other commonly employed additives.

The epoxylated phenolic resins of the invention may also be modified by reaction with fatty acids to provide resinous materials which are of special utility as surface coatings. Thus they may be reacted with, for example, drying or semi-drying oil fatty acids derived from linseed, soybean, perilla, sunflower or tung oils or with mixtures of such acids. The epoxy esters prepared in this manner may be converted to air drying surface coatings by the addition of suitable driers, for example metal soaps such as lead octoate, cobalt naphthenate and cobalt 2-ethylhexoate.

The following examples illustrate the invention.

EXAMPLE 1

Phenol (1.5 mole, 141 g.) and p-xylylene glycol dimethyl ether (1.0 mole, 166.2 g.) were heated to a temperature of 130° C. with stirring in order to remove water from the system. Stannic chloride (0.002 mole, 0.23 ml.) was then added to the mixture at 80° C. and the temperature of the reactants increased to 170°, the methanol formed being allowed to distill out. The heating was continued until no further methanol was liberated, the reaction then being substantially complete. The reaction product was a dark brown solid.

81 g. of the above polymer were mixed with epichlorhydrin (1.0 mole, 92.5 g.) and the mixture was heated to 60° C. Sodium hydroxide (200 g. of a 10% solution) was added dropwise at this temperature. The temperature was then raised to 95° C. for 3 hours. On cooling the product was dissolved in a 1.1 mixture of ethyl methyl ketone and toluene and the solution washed repeatedly with water until a neutral, chloride-free wash was obtained. The solvents and unreacted epichlorhydrin were then removed by vacuum distillation leaving a dark brown viscous liquid with an epoxy content of 6.07% by weight.

When this liquid was mixed with 10% by weight of triethylamine and heated at 120° C. for 1 hour a hard brittle resinous product was obtained.

EXAMPLE 2

Phenol (0.5 mole, 47 g.), resorcinol (0.5 mole, 55 g.), diphenyl (0.5 mole, 77.1 g.) and p-xylylene glycol dimethyl ether (1 mole, 166.2 g.) were heated to a temperature of 130° C. with stirring in order to remove any water from the system. On cooling to 80° C., stannic chloride (0.002 mole, 0.23 ml.) was added and the temperature of the reaction mixture increased to 145° C. The methanol formed in the reaction was allowed to distill out the heating being continued until no further methanol was evolved. The end product when cooled to 25° C. was a viscous yellow liquid.

Some of the above polymer (71 g.) and epichlorhydrin (1 mole, 92.5 g.) were mixed and the mixture heated to 60° C. At this temperature a careful, dropwise addition of 200 g. of a 10% solution of sodium hydroxide was made such that the reaction mixture remained slightly alkaline. Upon completion of the addition the temperature was raised to 95° C. and held there for 3 hours. The final product was dissolved in a 1:1 mixture of ethylmethyl-ketone and toluene and washed with water until a neutral, chloride-free wash was obtained. The solvent and excess epichlorhydrin were removed by vacuum distillation leaving a highly viscous, orange coloured liquid.

When 10% by weight of triethylamine was added to this liquid and the mixture was heated at 120° C. for 1 hour a brittle, infusible solid was obtained.

EXAMPLE 3

50 pts. of the prepared in Example 1 was mixed with 50 pts. of nadic methyl anhydride and 0.05 pt. 2.4,6-tris (dimethyl amino methyl)phenol. The mixture was dissolved in ethyl methyl ketone and coated on to glasscloth (Marglass 5X treated with a P705 amino silane finish) to give a resin content of 37%. The coated glasscloth was precured at 130° C. for 10 minutes, cooled and cut into twenty 10 in. squares which were then pressed together at 175° C. for 10 minutes at 1,000 p.s.i. The resulting laminated board was post cured at 250° C. for 20 hours and had a flexural strength (measured in the warp direction), of 121,500 p.s.i. at room temperature and 14,800 p.s.i. at 250° C.

EXAMPLE 4

Phenol (4 moles, 376 gms.), diphenyl oxide (2 moles, 340 gms.) and p-xylyleneglycol dimethyl ether (4 moles, 664.8 gms.) were heated together to 130° with stirring in order to remove water from the system. Stannic chloride (0.008 mole, 0.92 ml.) was then added to the mixture at 80° C. and the temperature increased to 170° C., the methanol formed being distilled off. The heating was continued until no more methanol was liberated. The reaction product was a dark brown solid.

1125 gms. of the above resin were mixed with epichlorhydrin (8 moles, 740 gms.) and the mixture heated to 60° C. Sodium hydroxide (1600 gms. of a 10% solution) was added dropwise at this temperature keeping the reaction mixture slightly alkaline. The temperature was then raised to 95° C. for 3 hours. On cooling, the product was dissolved in a 1:1 mixture of ethyl methyl ketone and toluene and the solution washed repeatedly with water until a neutral, chloride-free wash was obtained. The solvents and unreacted epichlorhydrin were then removed by vacuum distillation leaving a dark brown viscous liquid.

55 pts. of the above resin were diluted with ethyl methyl ketone and mixed with 45 pts. of nadic methyl anhydride and 5 pts. of 2.4,6-tris (dimethyl amino methyl) phenol. The resin was coated onto glasscloth (Marglass 5X with a P705 amino silane finish) using a 10 minute precure at 150° C. to give a resin content of 31%. The impregnated cloth was then cut into twenty 10 inch squares which were then pressed together at 175° C. for 10 minutes at 1,000 p.s.i. to give a board which was post cured at 250° C. for 24 hours. The flexural strengths of the board when measured in the warp direction was 101,000 p.s.i. at room temperature and 10,000 at 250° C.

That which is claimed is:
1. A process for preparing an epoxylated phenolic resin comprising (1) forming a polymer by admixing and reacting together at a temperature of at least 120° C. and in the presence of an acidic catalyst reactant (A) an aralkyl ether of the general formula R'[—(CH$_2$OR)]$_a$, wherein R' is selected from the group consisting of divalent and trivalent aromatic hydrocarbon radicals and di(aromatic hydrocarbon) ether radicals, the said radicals optionally containing inert substituents in the aromatic nucleus, R is an alkyl radical containing less than 6 carbon atoms and $a$ has a value of 2 or 3, with a molar excess of reactant (B) (i) a phenolic compound containing from one to three hydroxy groups, or (ii) both a phenolic compound and a compound other than (i) containing one or more aromatic nuclei; and (2) thereafter reacting the said polymer with an epihalohydrin at a temperature at which a hydrogen halide is generated and in the presence of a hydrogen halide acceptor.

2. The process according to claim 1 wherein the hydrogen halide acceptor is sodium hydroxide.

3. The process according to claim 1 wherein the aralkyl ether (A) is p-xylyleneglycoldimethylether.

4. The process according to claim 1 wherein there is added to the epoxylated phenolic resin produced thereby a catalyst effective for hardening materials containing epoxy groups.

5. The process according to claim 4 wherein the catalyst is selected from the group consisting of organic amines and acid anhydrides.

6. The process of claim 1 wherein from 1.3 to 3 moles of said reactant (B) are employed for every mole of said reactant (A) and wherein said epihalohydrin is epichlorhydrin.

7. The process of claim 6 wherein said reactant (B) is a phenolic compound selected from the group consisting of phenol, p-cresol, resorcinol, catechol, isopropyl catechol, diphenylolpropane, diphenylolmethane, p-ethylphenol, p-tert-butylphenol and p-tert-octyl phenol, p-phenylphenol, m-phenylphenol, o-phenylphenol, pyrogallol and phloroglucinol.

8. The process of claim 7 wherein said reactant (A) is p-xylyleneglycoldimethylether.

9. The process of claim 8 wherein said phenolic compound is phenol.

10. The process of claim 6 wherein said reactant (B) is at least one phenolic compound selected from the group consisting of phenol, p-cresol, resorcinol, catechol, isopropyl catechol, diphenylolpropane, diphenylolmethane, p-ethylphenol, p-tert-butylphenol and p-tert-octyl phenol, p-phenylphenol, m-phenylphenol, o-phenylphenol, pyrogallol and phloroglucinol; and also at least one compound containing an aromatic nucleus selected from the group consisting of diphenyl ether, dibenzyl ether, terphenyl, diphenylamine, diphenyl sulphide, diphenyl, anthracene, naphthalene, diphenyl sulphone, triphenyl phosphate, octaphenylcyclotetrasiloxane, aryl-substituted borazoles and ferrocene.

11. The process of claim 10 wherein said reactant (A) is p-xylyleneglycoldimethylether.

12. The process of claim 11 wherein said phenolic compound is phenol.

References Cited

UNITED STATES PATENTS 3,384,617   5/1968   Casale et al. _____ 260—47 EP

WILLIAM H. SHORT, Primary Examiner

T. E. PERTILLA, Assistant Examiner

U.S. Cl. X.R.

117—124 E, 126 AB, 161 ZB; 161—184 R; 260—18 EP, 37 EP, 348 C, 348.6R